US012122642B2

(12) United States Patent
Stam

(10) Patent No.: US 12,122,642 B2
(45) Date of Patent: Oct. 22, 2024

(54) OVERSPEED GOVERNOR FOR A STAIRLIFT

(71) Applicant: OTOLIFT TRAPLIFTEN B.V., Bergambacht (NL)

(72) Inventor: Michel Alexander Stam, Bergambacht (NL)

(73) Assignee: OTOLIFT TRAPLIFTEN B.V., Bergambacht (NL)

( * ) Notice: Subject to any disclaimer, the term of this patent is extended or adjusted under 35 U.S.C. 154(b) by 0 days.

(21) Appl. No.: 17/916,596

(22) PCT Filed: Apr. 20, 2021

(86) PCT No.: PCT/EP2021/060169
§ 371 (c)(1),
(2) Date: Oct. 3, 2022

(87) PCT Pub. No.: WO2021/219425
PCT Pub. Date: Nov. 4, 2021

(65) Prior Publication Data

US 2023/0339725 A1 Oct. 26, 2023

(30) Foreign Application Priority Data

Apr. 28, 2020 (NL) ...................................... 2025442

(51) Int. Cl.
*B66B 5/20* (2006.01)
*B66B 5/04* (2006.01)
(Continued)

(52) U.S. Cl.
CPC ................ *B66B 5/20* (2013.01); *B66B 5/044* (2013.01); *B66B 5/26* (2013.01); *B66B 9/0815* (2013.01)

(58) Field of Classification Search
CPC .. B66B 5/20; B66B 5/044; B66B 5/26; B66B 9/0815
See application file for complete search history.

(56) References Cited

U.S. PATENT DOCUMENTS 6,659,230 B1 * 12/2003 Jenkins ..................... B66B 9/08 187/202
9,663,326 B2 * 5/2017 Osmanbasic ............. B66B 5/18
(Continued)

FOREIGN PATENT DOCUMENTS

EP 1449801 A1 * 8/2004 ........... B66B 9/0815
JP 2009113944 A 5/2009
WO 2019077481 A1 4/2019

OTHER PUBLICATIONS

International Preliminary Report on Patentability dated Oct. 27, 2022, for Application No. PCT/EP2021/060169 (eight (8) pages).
(Continued)

*Primary Examiner* — Michael A Riegelman
(74) *Attorney, Agent, or Firm* — KDW Firm PLLC

(57) ABSTRACT

An overspeed governor for a stairlift includes a governor frame mountable to a carriage of a stairlift. A wheel is engageable with a rail of the stairlift along which the carriage is moveable. Translation of the carriage along the rail is transformed into rotation of the wheel or vice versa. A safety braking device has a braking surface movable between a first position and a third position. In the first position the braking surface is not allowed to engage the rail. A braking member is coupled to the wheel such that when said wheel rotates at a speed at or above a predetermined threshold, the braking member is moved from the first position to the third position. In the third position the braking surface engages said rail with a braking force to stop
(Continued)

movement of the carriage along the rail. A soft landing means gradually slows movement of the carriage.

13 Claims, 10 Drawing Sheets

(51) Int. Cl.
*B66B 5/26* (2006.01)
*B66B 9/08* (2006.01)

(56) References Cited

U.S. PATENT DOCUMENTS

| | | | | |
|---|---|---|---|---|
| 9,745,171 | B2 * | 8/2017 | Husmann | B66B 5/20 |
| 10,053,334 | B1 * | 8/2018 | Cheng | F16D 63/006 |
| 11,427,438 | B2 * | 8/2022 | Lodi | B66B 5/044 |
| 11,560,290 | B2 * | 1/2023 | Lodi | B66B 9/08 |
| 2008/0245617 | A1 * | 10/2008 | Madoz Michaus | B66B 5/044 187/373 |
| 2010/0274409 | A1 * | 10/2010 | Smith | B66B 9/0838 700/304 |
| 2012/0048652 | A1 * | 3/2012 | DiGiovanni | B66B 9/0815 187/201 |
| 2020/0277161 | A1 * | 9/2020 | Lodi | B66B 5/044 |
| 2023/0339725 | A1 * | 10/2023 | Stam | B66B 5/044 |

OTHER PUBLICATIONS

International Search Report and Written Opinion dated Jul. 6, 2021, for Application No. PCT/EP2021/060169 (14 pages).

* cited by examiner

OVERSPEED GOVERNOR FOR A STAIRLIFT

This application is a national stage filing under 35 U.S.C. 371 of pending International Application No. PCT/EP2021/060169, filed Apr. 20, 2021, which claims priority to Netherlands Patent Application No. 2025442, filed Apr. 28, 2020, the entirety of which applications are incorporated by reference herein.

The invention relates to an overspeed governor for a stairlift comprising a carriage travelling along a rail mounted on or along a staircase. Such an overspeed governor causes the stairlift to automatically brake and come to a standstill if the traveling speed of the stairlift along the rail exceeds a predetermined maximum, for instance in case of mechanical failure. The goal of the invention is an overspeed governor which is safe, reliable and/or effective.

To that end the overspeed governor according to the invention comprises: a governor frame which is mountable to a carriage of a stairlift; a wheel which is rotatably mounted in said frame around a rotation axis, in such a manner that it is allowed to engage a rail of said stairlift along which said carriage is moveable, and such that during use, while being engaged to the rail, translation of the carriage along said rail is transformed into rotation of said wheel or vice versa; a safety braking device which is mounted in said frame, having a braking member comprising a braking surface being movable between a first position and a third position, wherein in the first position the braking surface is not allowed to engage the rail; wherein said braking member is coupled to said wheel such that when said wheel rotates at an operational speed at or above a predetermined speed threshold, the braking member is moved from the first position to the third position; wherein in the third position the braking surface engages said rail with a braking force which is high enough to stop movement of the carriage along the rail; wherein the safety braking device is provided with a soft landing means designed to gradually slow down the movement of the carriage along the rail after the braking member is moved away from the first position and before the movement of the carriage is stopped.

The soft landing means prevents too large deceleration forces, which may cause damage to the carriage and/or which could lead to accidents. Preferably the soft landing means are designed such that the deceleration forces on the carriage are kept below 2G.

In a preferred embodiment said braking surface is movable between said first position, a second position between said first and third positions, and said third position, wherein, when said wheel rotates at an operational speed at or above a predetermined speed threshold, the braking member is moved from the first position to the second position; wherein in the second position the braking surface engages said rail with a minimum braking force which is not high enough to stop movement of the carriage along the rail; wherein the braking member is designed such that the braking force on the rail gradually increases when it moves from the second position to the third position; wherein said braking member is further designed such that, once the braking surface engages the rail in the second position, the braking surface is moved to the third position by the weight of the carriage and where applicable the weight of a person sitting on the carriage, thereby forcing said stop; wherein said soft landing means is designed to exert a force against the braking member while moving between the second position and the third position, such that the movement of the braking member from the second position to the third position is hindered and slowed down by said soft landing member, such that said gradual increase of the braking force on the rail is slowed down when it moves from the second position to the third position.

The soft landing means may comprise a spring member, one end of which is connected to said braking member and the other end of which is connected to said frame, wherein exerting said force against the braking member comprises said spring exerting a spring force on said braking member.

In a preferred embodiment said soft landing means comprises a first friction member connected to said braking member and having a first friction surface, and a second friction member connected to said frame and comprising a second friction surface, wherein said exerting said force against the braking member comprises said first friction surface of said first friction member exerting a frictional force against said second friction surface of said second friction member. the soft landing means is designed to exert a gradually increasing force against the braking member while moving between the second position and the third position.

The soft landing means is preferably designed such that the force against the braking member significantly drops down before the third position is reached, such that the further rotation of the braking member to the third position is ensured, until further movement of the braking member is stopped in said third position.

Preferably said first friction member is a cam, and said second friction member is a cam disc having a friction surface which at least partially extends in non-concentric curves around said rotation axis, such that said force against said braking member varies in accordance with the curved shape of said friction surface. Preferably said cam disc and said braking member are mounted in a mutually coaxial relationship.

In a preferred embodiment said braking member comprises two spaced apart ones of said braking surfaces, such that the both of said braking surfaces are not allowed to engage the rail when the braking member is in said first rotational position; and wherein one of said braking surfaces is forced to engage said rail when the braking member is in an upwards second rotational position and the other one of said braking surfaces is forced to engage said rail when the braking member is in a downwards second rotational position, wherein said upwards and downwards second rotational positions are mirrored with regard to the first rotational position; and wherein said soft landing means is also mirrored with regard to the first rotational position.

Preferably said braking surfaces extend in non-concentric curves around said rotation axis, and preferably said braking surface or braking surfaces are formed by teeth. Said wheel preferably is a toothed gear wheel or a smooth wheel having a flat rail engagement surface. Preferably said governor frame comprises a shaft which has said rotation axis as its central axis, on which said wheel and braking member are rotatably mounted, said shaft being mountable to the carriage of the stairlift.

The invention also relates to a stairlift carriage provided with an overspeed governor. Said stairlift carriage preferably comprises a second wheel or gear arranged to engage said rail such that said second wheel or gear and said braking member engage the rail at opposite sides, such that the wheel or gear and the braking member clamp the rail between them when the braking member is in the third position. Preferably said wheel or gear is a motor driven wheel or gear.

The invention will now be elucidated by means of a preferred embodiment, with reference to the drawings, in which.

Figure 1A:
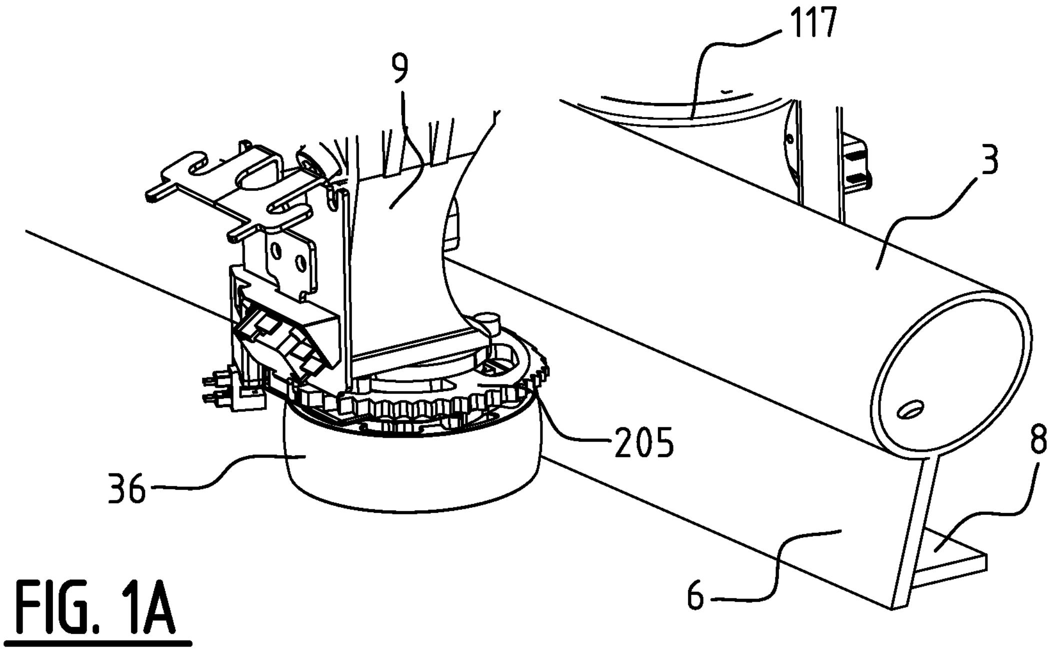
FIGS. 1A and 1B are perspective views of an overspeed governor.
Figure 1B:
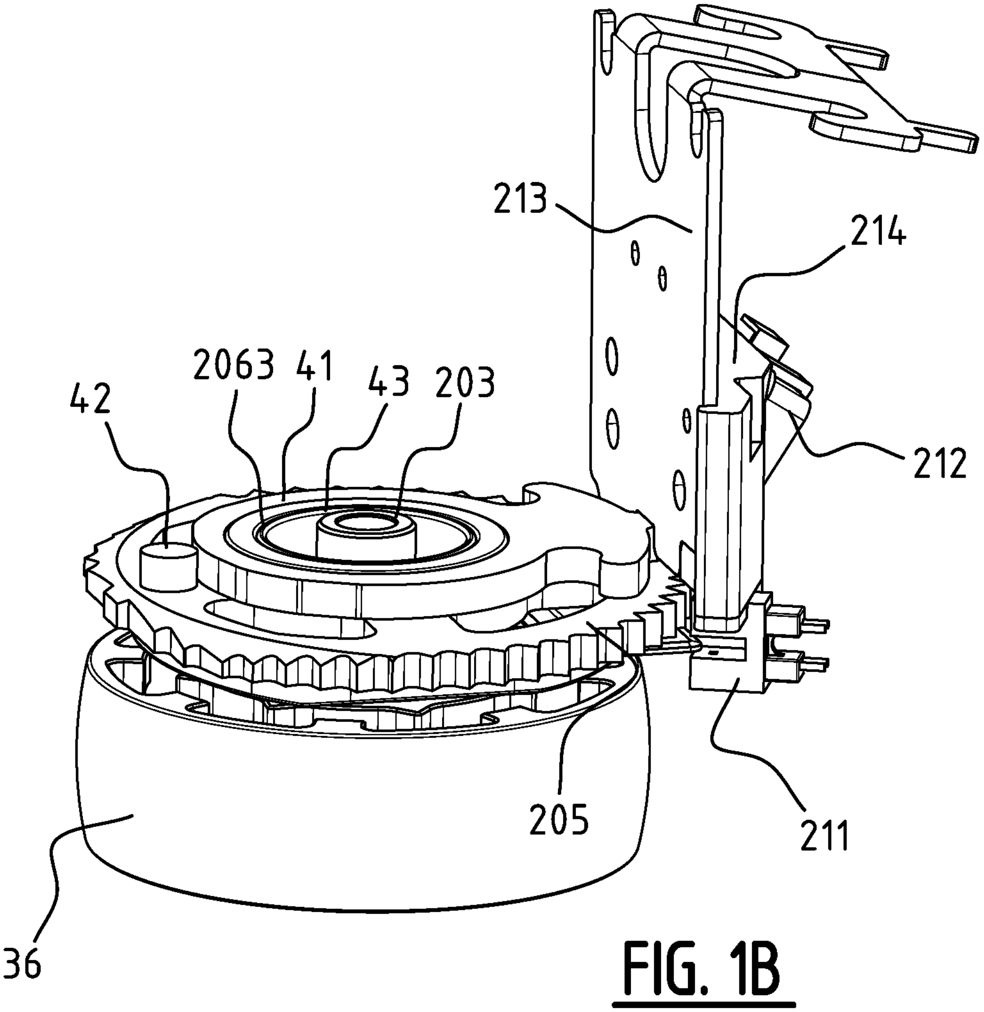

Referring to FIGS. 1A/B and 2A/B, the overspeed governor comprises a governor frame 201 which is attached to the carriage frame of a stairlift, such as the carriage frame 9 as described in European patent application publication EP 1 449 801 A1, the disclosure of which is incorporated herein by reference, and wherein similar parts are indicated by the same reference numerals as used here. The carriage frame 9 is displaceable along a rail 3. The rail 3 is comprised of a tubular part and a protruding strip 6 extending therefrom, which is used for keeping the carriage frame upright, as described in EP 1 449 801 A1.

The governor frame 201 comprises a shaft 202 on which the roller 36 is rotatably mounted by means of bushing 203 and bearings 204. The bushing 203 is unrotatably fixed to the shaft 202 and the governor frame 201 by means of bolt 209. The roller 36 rests against the strip 6, and is rotated by the movement of the carriage frame 9 along the rail 3. On the same shaft 202 and bushing 203 a braking member 205 is rotatably mounted by means of a rotatable support member 206, which is rotatably mounted on the bushing 203. The support member 206 is provided with a sliding follower frame 207 extending between the wheel 36 and the braking member 205, and comprising a pin 208. The follower frame 207 with the pin 208 is mounted on the support member 206 by means of mutually engaging guiding means 2061, 2071, such that it is allowed to slide on the support member 206 in a direction which perpendicular to the axis of the shaft 202. The pin 208 extends into a radially extending slot 2051 of the braking member 205, said slot 2051 forming a radially extending guide, such that rotation of the follower frame 207 and the support member 206 around the axis of the shaft 202 causes rotation of the braking member 205. The braking member 205 is held in a neutral (non-rotated) position by a holding member 210 which is resiliently mounted to the carriage frame 9 by means of mounting parts 211, 212, 213, 214 and the holding member 210 extends into a small recess 2053 of the braking member 205. When the braking member 205 experiences a relatively small rotational force from the pin 208, the holding member 210 is moved out of the recess such that the braking member 205 can rotate freely.

Figure 3A:
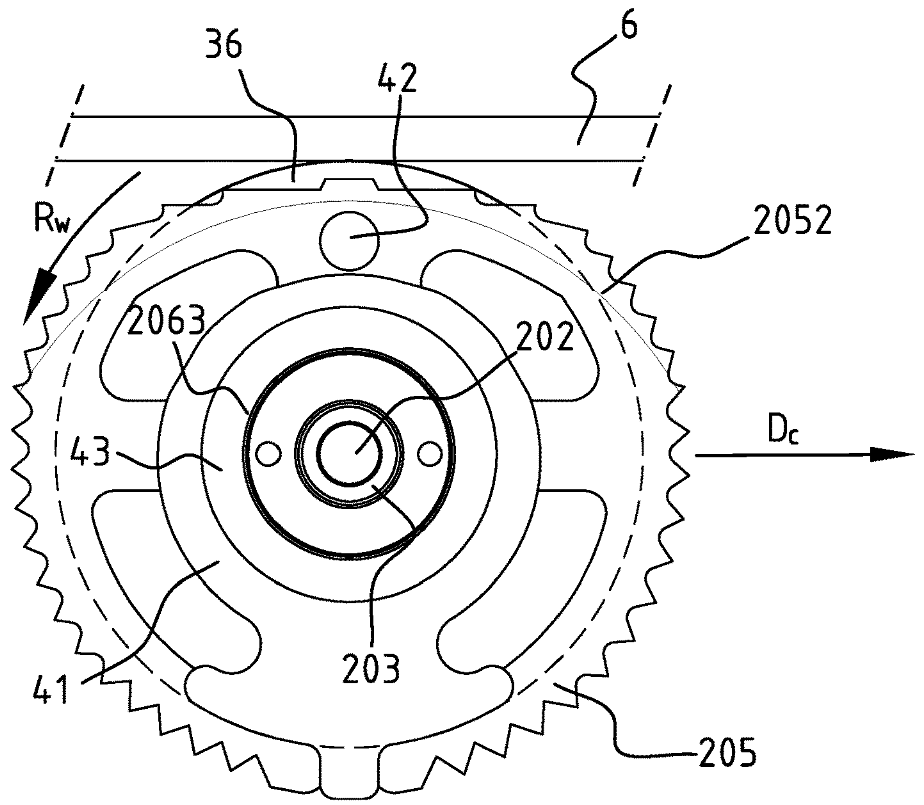
FIG. 3A is a top view of the braking member of the overspeed governor of FIG. 1 in a first rotational position ($pos_0$) during normal operation.
Figure 4A:
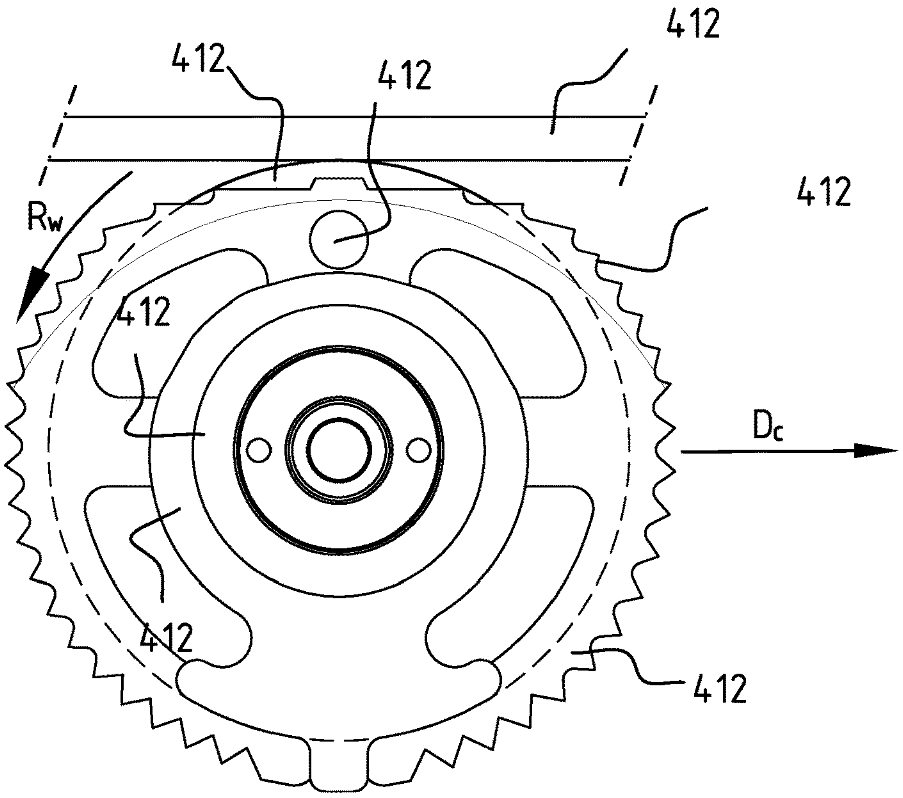
FIG. 4A is a top view of the braking member of the overspeed governor of FIG. 1 in the first rotational position ($pos_0$) during normal operation.

The braking member 205 is provided with two spaced apart braking surfaces 2052, comprised with teeth for providing sufficient braking friction. The braking surfaces 2052 extend radially outward from the braking member 205 at two sides of the part of the braking member 205 directly facing the protruding strip 6 when the braking member 5 is held in the neutral (non-rotated) position (the first position), such that they do not engage the protruding strip 6 of the rail 3, as can be seen in FIGS. 3A and 4A. When the braking member 205 is rotated in either direction from said neutral position, the respective braking surface 2052 is forced to engage the strip 6 (in a second position), such that it causes the carriage to stop moving along the rail 3 by the braking friction caused by the teeth of the braking surface 2052 (in a third position), as can be seen in FIGS. 6A-F. The braking surfaces 2052 extend in non-concentric curves around the rotation axis, such that the force on the rail initially gradually increases when the braking member is rotated from the second position to the third position.

Figure 3B:
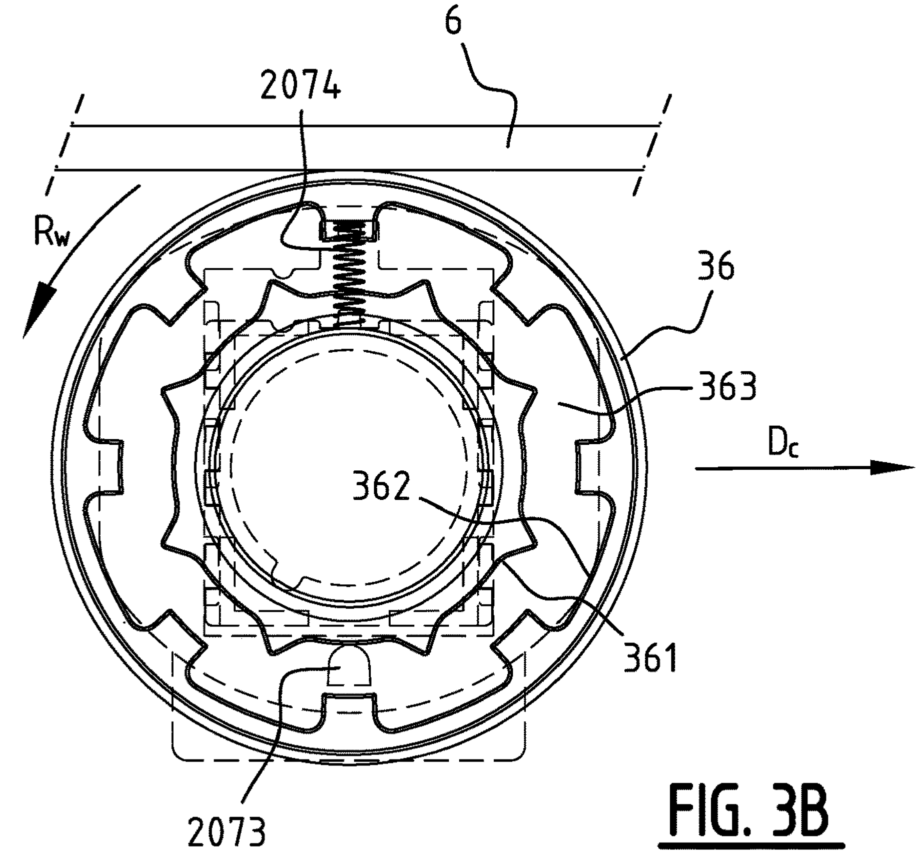
FIG. 3B is a top view of the wheel of the overspeed governor of FIG. 1 in the first rotational position during normal operation.
Figure 4B:
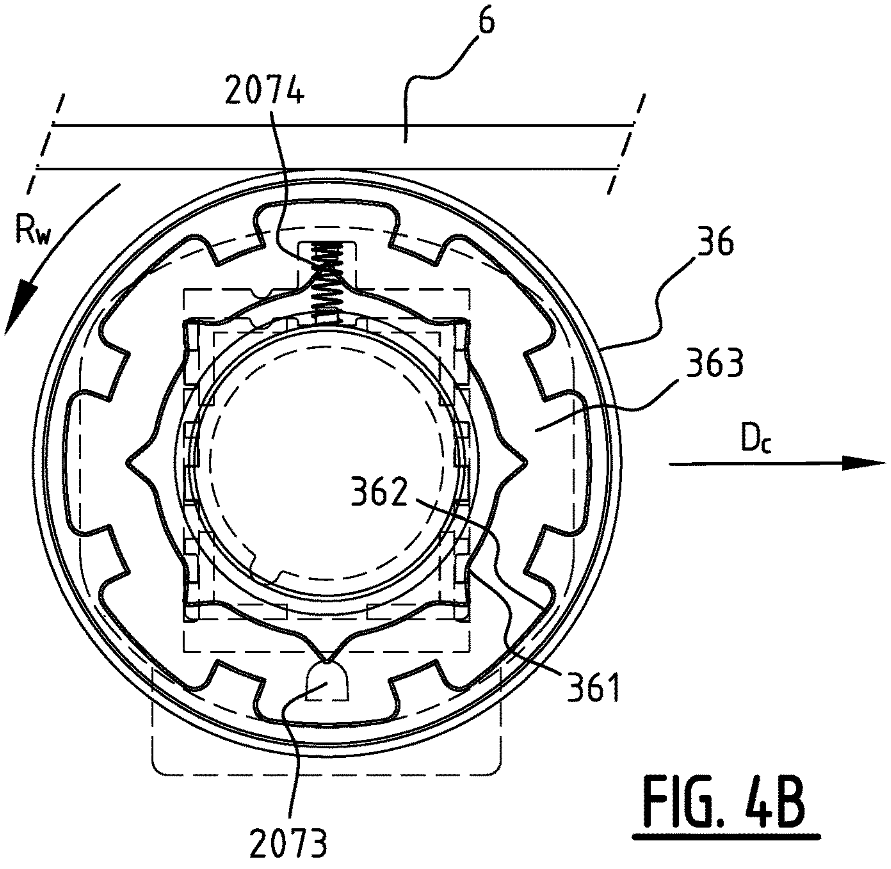
FIG. 4B is a top view of the wheel of the overspeed governor of FIG. 1 in a second rotational position during normal operation.
Figure 5A:
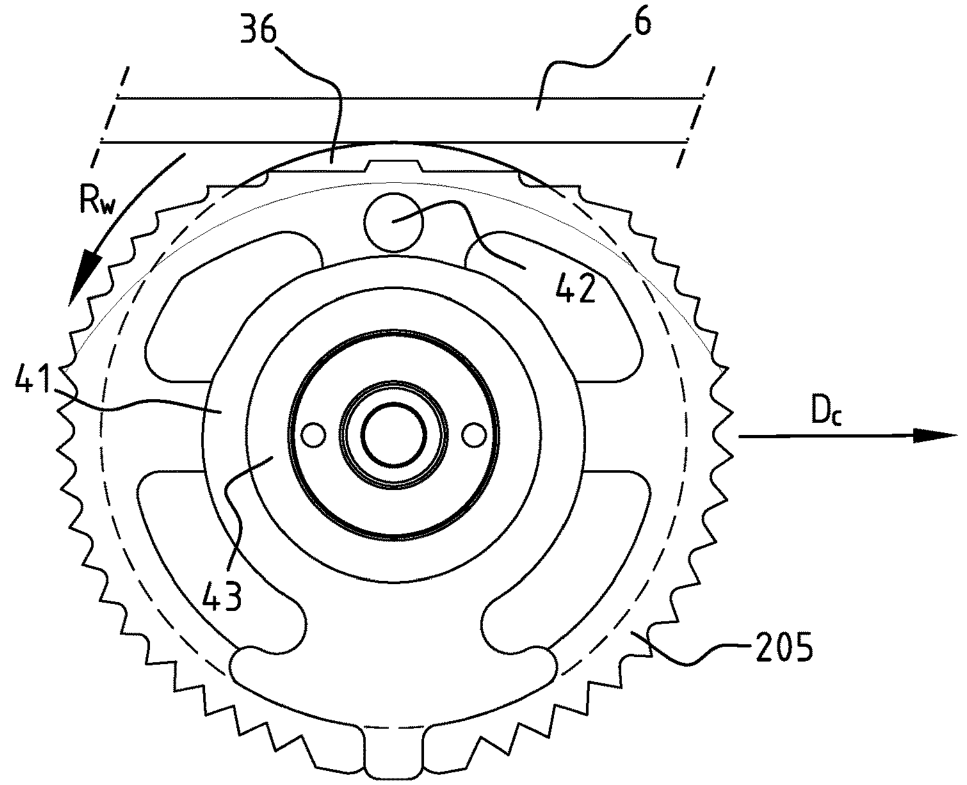
FIG. 5A is a top view of the braking member of the overspeed governor of FIG. 1 in the first rotational position ($pos_0$) at the start of an overspeed emergency brake.
Figure 5B:
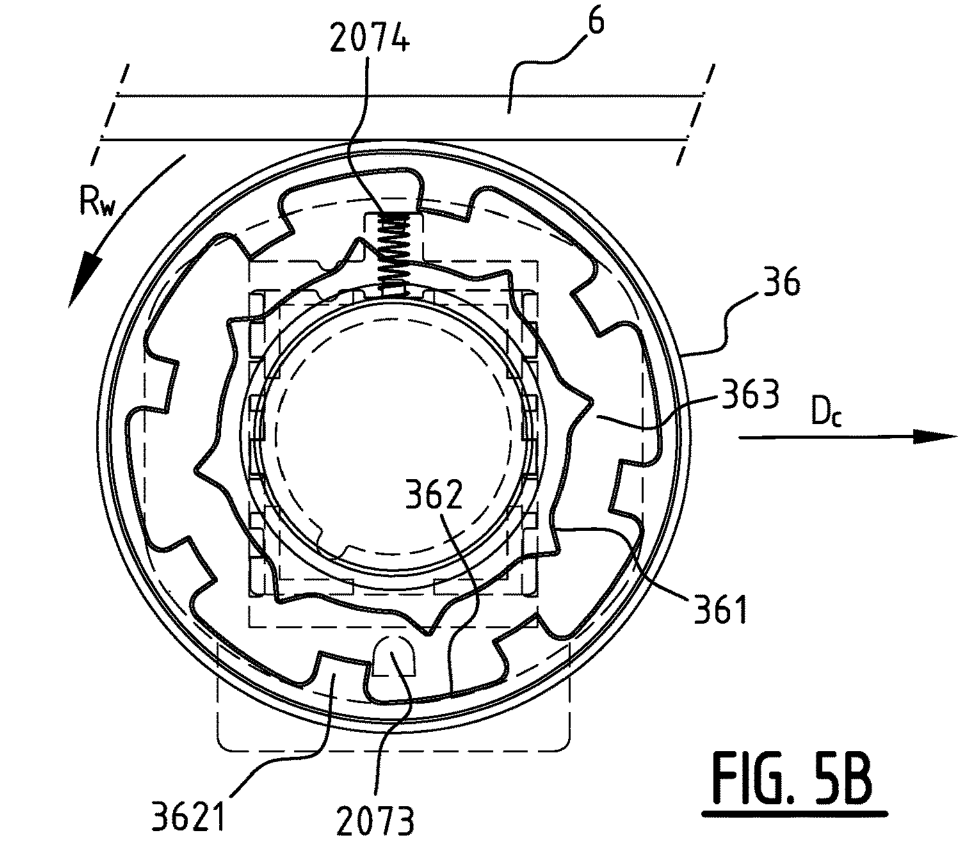
FIG. 5B is a top view of the wheel of the overspeed governor of FIG. 1 in a third rotational position at the start of an overspeed emergency brake.

With reference to FIGS. 3B, 4B and 5B, the wheel 36 comprises a substantially circular groove 363 having a profiled radially outward facing first guiding surface 361 and a profiled radially inward facing second catching surface 362 extending around the first surface 361. A following member 2073 mounted on the follower frame 207 extends in the groove 363 between said guiding surface 361 and said catching surface 362.

The following member 2073 is connected to the braking member 205 by means of the pin 208 extending in the slot 2051 of the braking member 205, so as to allow movement relative to said braking member 205 in a direction having a radial component, and so as to exert a rotational force on the braking member 205 when the following member 2073 is rotated around the axis. The pin 208 has a common axis with the following member 2073.

The following member 2073 is biased against the guiding surface 361 by means of a spring 2074 in the radial direction when the wheel 36 rotates at an operational speed below a speed threshold, as can be seen in FIGS. 3A/B and 4A/B. The guiding surface 361 is shaped with outward protruding triangular protrusions 3611 in such a manner that said following member 2073 is thrown away from said guiding surface 361 in the radial direction when the wheel 36 rotates at an operational speed at or above the speed threshold. The catching surface 362 is shaped with inwardly protruding block shaped protrusions 3621 in such a manner that it catches the following member 2073 when it is thrown away from the guiding surface 361 and forces the following member 2073 to rotate around the axis, as can be seen in FIG. 5B, thereby forcing the teeth of the braking surface 2052 towards the position (the second position) wherein they engage the strip 6 of the rail 3, as can be seen in FIG. 6A-F.

The overspeed governor is provided with a soft landing means in order to gradually slow down the movement of the carriage along the rail 6 before the movement of the carriage is fully stopped (in the third position). The soft landing means comprises a friction member in the form of a friction cam disc 41 which is mounted on the shaft 202 by means of a bushing 43, and which is further connected to mounting part 213 such that it cannot rotate around the shaft 202. The soft landing means furthermore comprises a cam in the form of friction pin 42, which is mounted on the braking member 205.

The friction cam disc 41 comprises a friction surface 411, against which the surface of the friction 20 pin 42 on the braking member 205 pushes while being rotated in tangential direction.

Figure 2A:
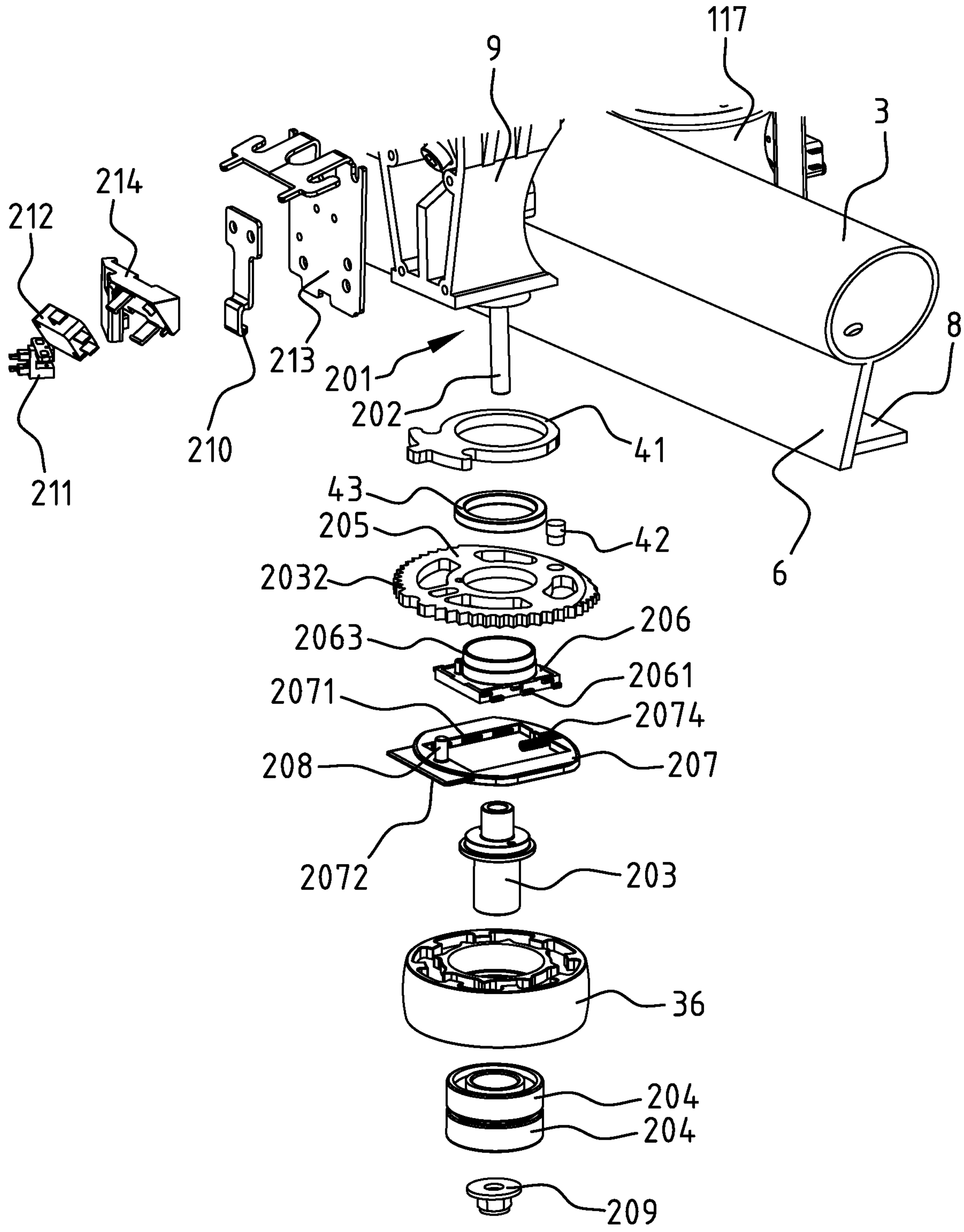
FIGS. 2A and 2B are exploded views of the overspeed governor of FIGS. 1A and 1B.
Figure 2B:
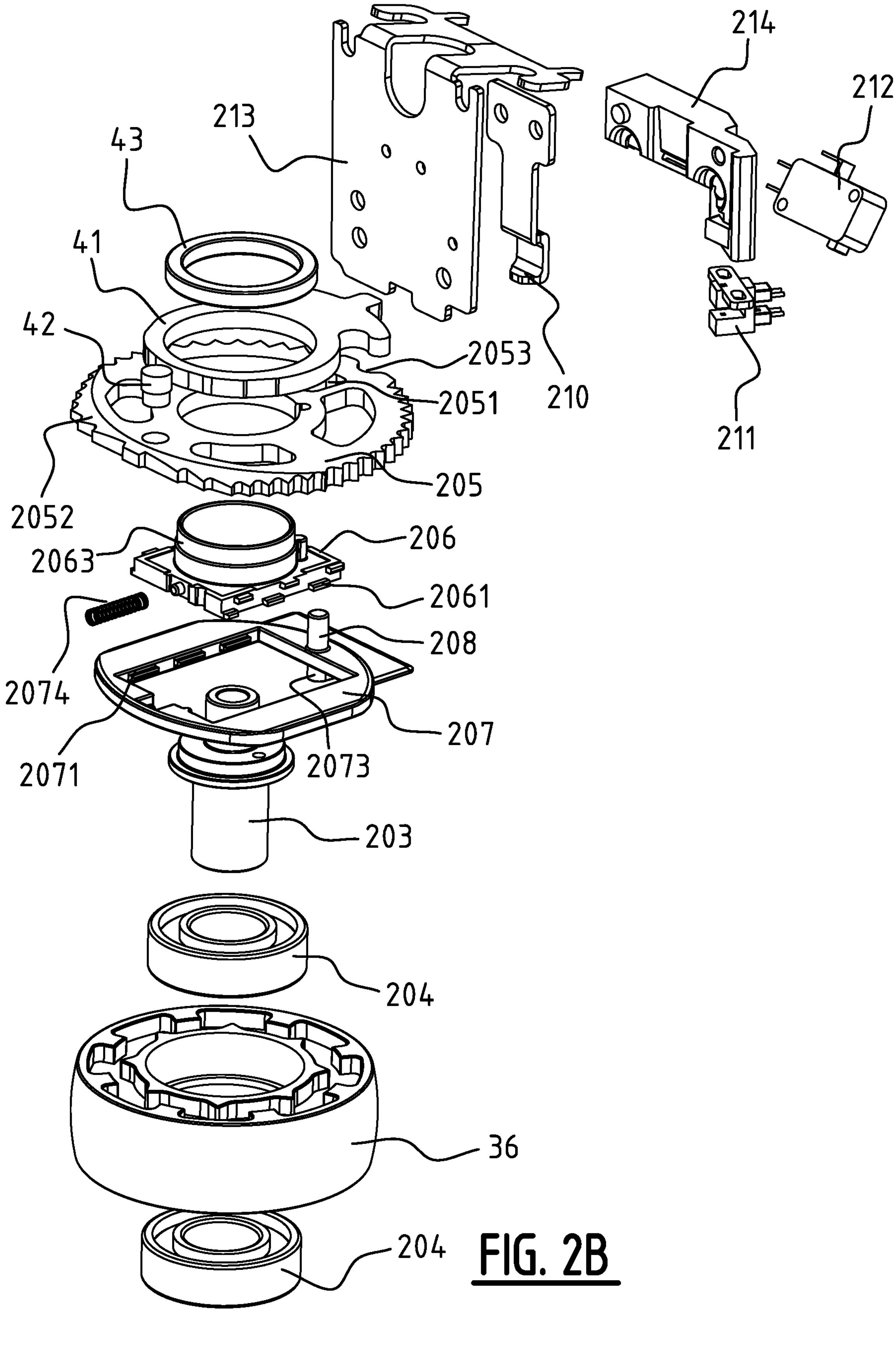
Figure 2C:
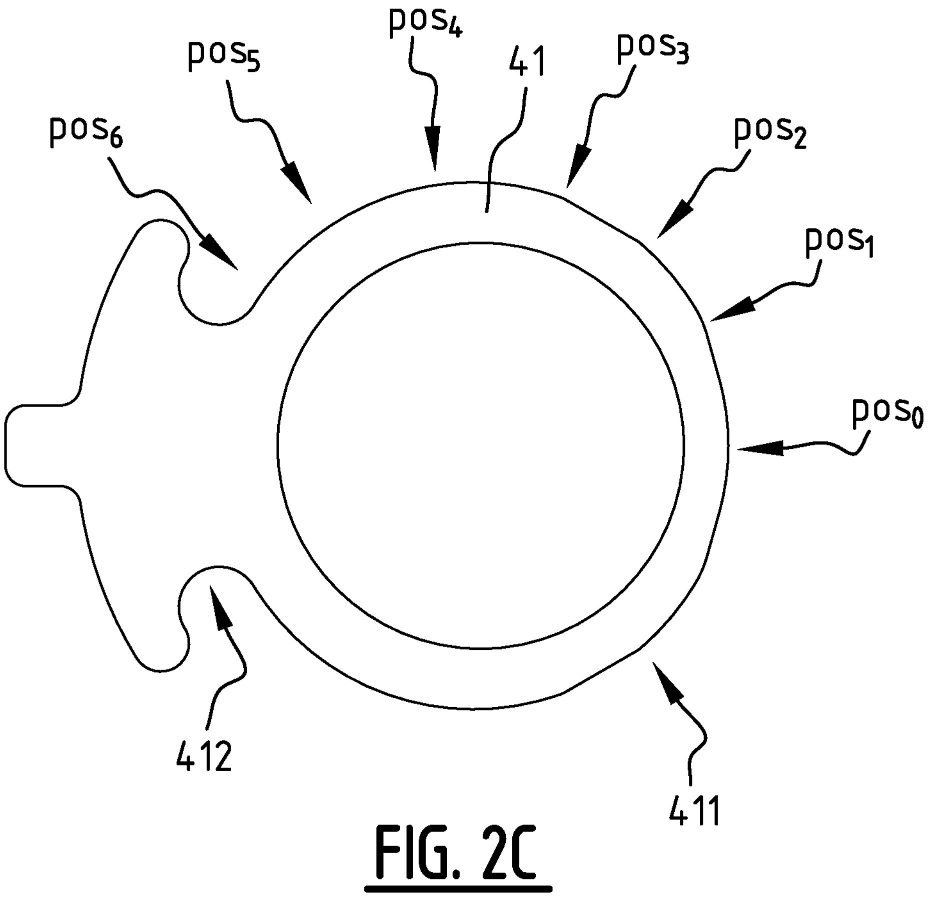
FIG. 2C is a top view of a friction member of the overspeed governor of FIGS. 1A and 1B.
Figure 6C:
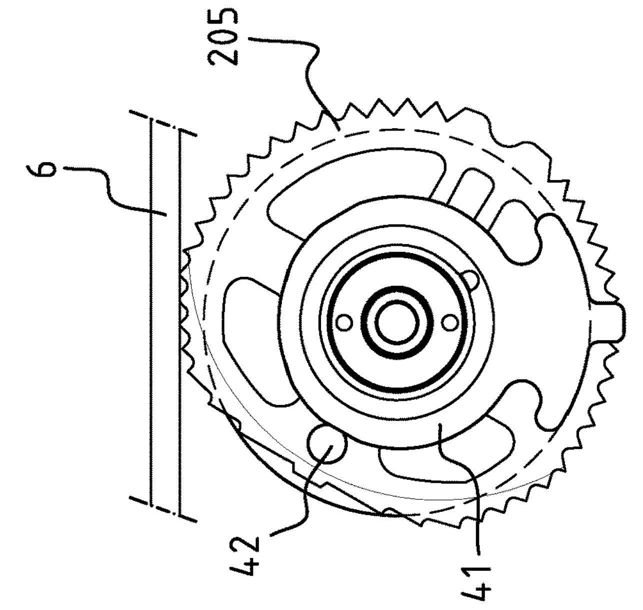
FIGS. 6A-6F are top views of the braking member of the overspeed governor of FIG. 1 in six different rotational positions ($pos_1$-$pos_6$) during an overspeed emergency brake.
Figure 6B:
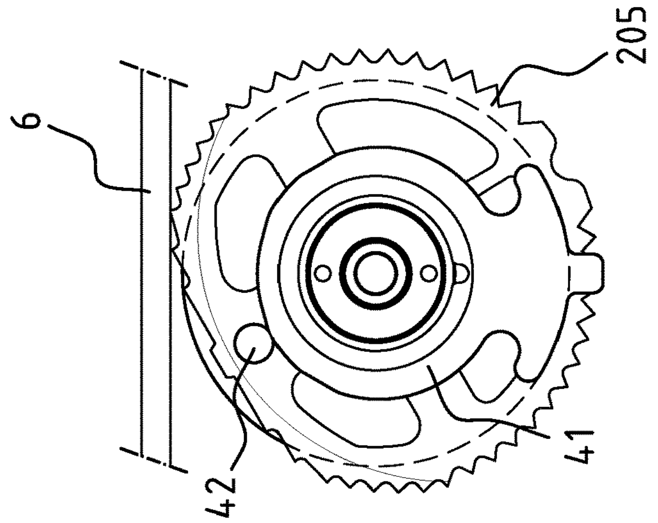
Figure 6A:
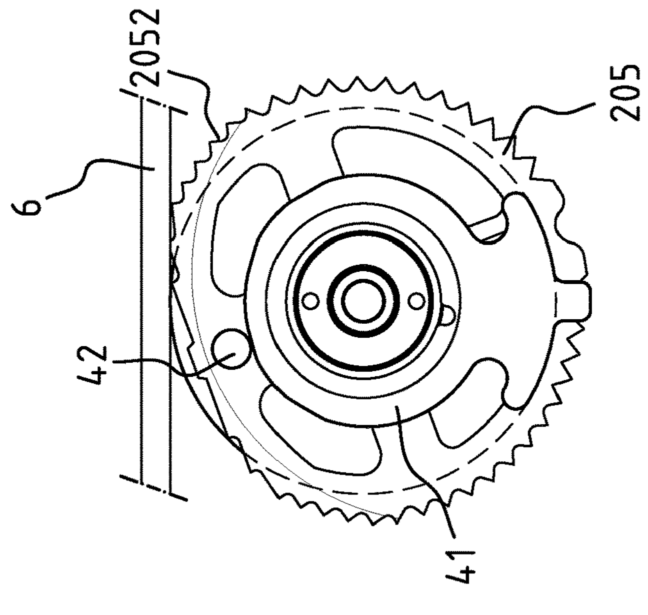
Figure 6F:
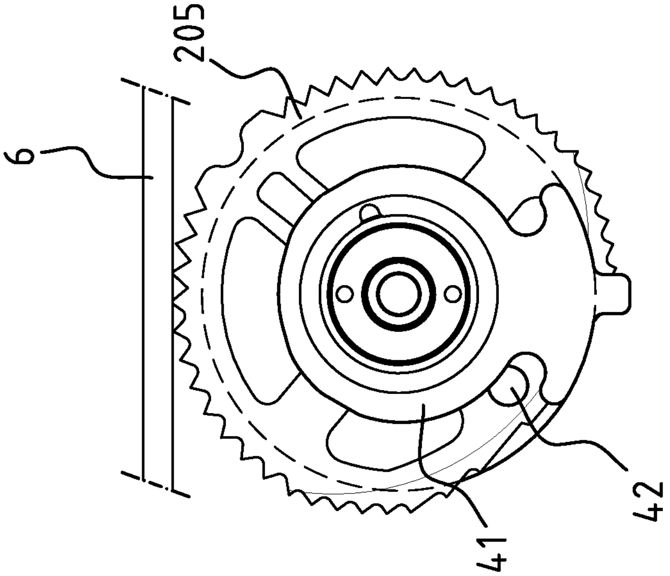
Figure 6E:
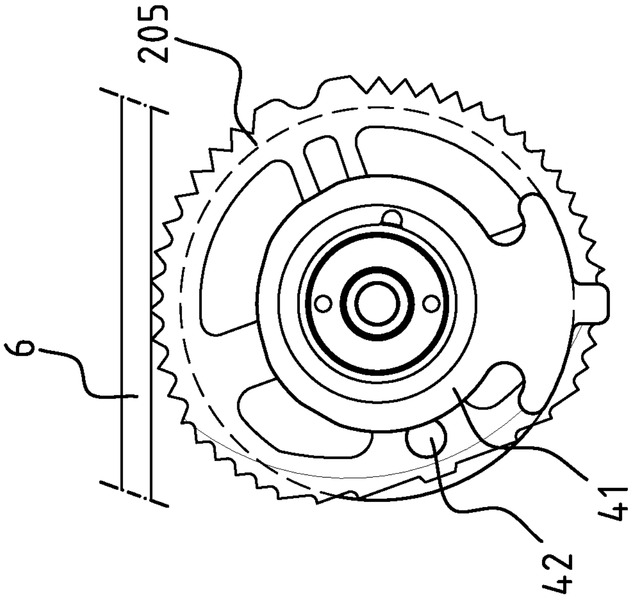
Figure 6D:
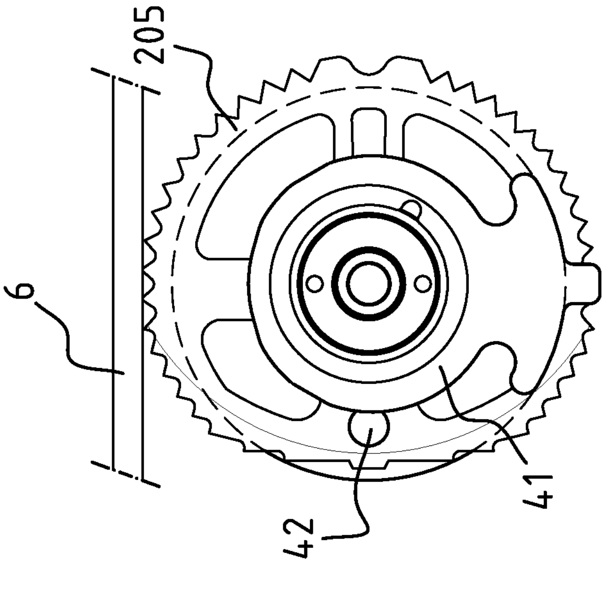
Figure 7:
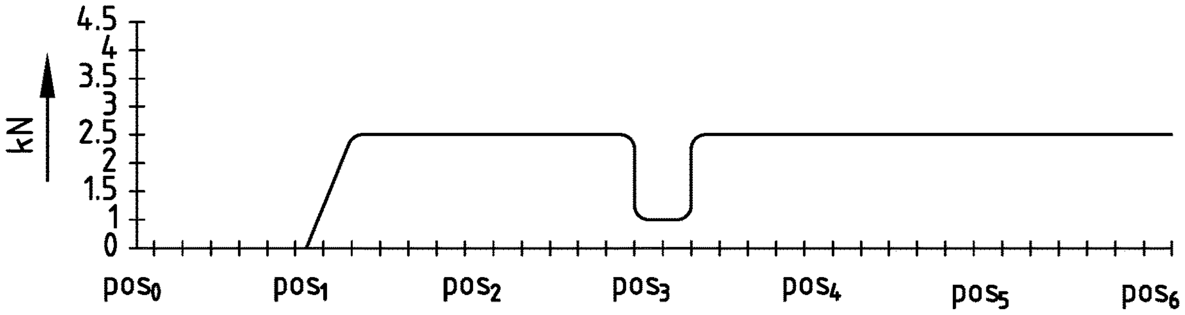
FIG. 7 shows a graph of the braking force from the friction pin on the friction surface of friction member against the rotational position of the braking member of the overspeed governor of FIG. 1.

In FIG. 2C and in FIGS. 7-9 various positions of the braking member 205 are indicated as follows:

$pos_0$ is the position of the braking member 205 as shown in FIG. 5A (the aforementioned first position);

$pos_1$ is the position of the braking member 205 as shown in FIG. 6A (the aforementioned second position);

$pos_2$ is the position of the braking member 205 as shown in FIG. 6B;

$pos_3$ is the position of the braking member 205 as shown in FIG. 6C;

$pos_4$ is the position of the braking member 205 as shown in FIG. 6D;

$pos_5$ is the position of the braking member 205 as shown in FIG. 6E; and $pos_6$ is the position of the braking member 205 as shown in FIG. 6F (the aforementioned third position).

The angular distance between each of said positions ($pos_0$-$pos_6$) is approximately 20-30 degrees. As shown in FIG. 2C, the friction surface 411 at least partially extends in non-concentric curves around the rotation axis, such that the force against said braking member 205 varies in accordance with the radius (i.e. the distance between the axis and the surface 411) of the curved shape of said friction surface 411. The cam disc 41 exerts a force against the pin 42 on the braking member 205 while the braking member 205 moves between the second position ($pos_1$) and the third position ($pos_6$), such that the movement of the braking member 205 is hindered and slowed down. Between $pos_0$ and $pos_1$ the radius increases until sufficient friction between the pin 42 and the disc 41 is obtained. Between $pos_1$ and $pos_6$ the radius is in principle constant, however, between $pos_2$ and $pos_3$ the radius shows a local dip such that the force against the braking member 205 significantly drops down briefly between $pos_3$ and $pos_4$, such that the further rotation of the braking member 205 to the third position ($pos_6$) is ensured. In $pos_6$ further movement of the braking member 205 is stopped, because the pin 42 runs against the stop surface 412 of the disc 41. FIG. 7 shows this in a graph of the braking force from the friction pin 42 on the friction surface of friction member 41 against the rotational position of the braking member 205.

Figure 8:
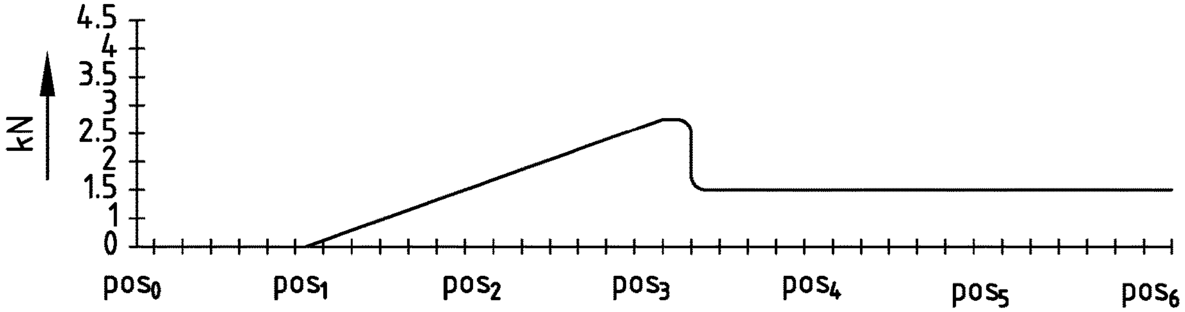
FIG. 8 shows a graph of the braking force of the braking member on the rail against the rotational position of the braking member of the overspeed governor of FIG. 1.

FIG. 8 shows a graph of the braking force of the braking member 205 on the rail 6 against the rotational position of the braking member 205. Between positions $pos_1$ and $pos_3$ the total braking force is a result of the pressure angle of the braking member 205, due to the increasing diameter of the braking member 205), and the friction of the pin 42. Between the positions $pos_4$ and $pos_6$ the braking force is caused by the friction of the pin 42 only. In $pos_6$ the pin 42 is completely blocked by the stop surface 412 of the friction member 41, such that the braking force reaches its maximum.

Figure 9:
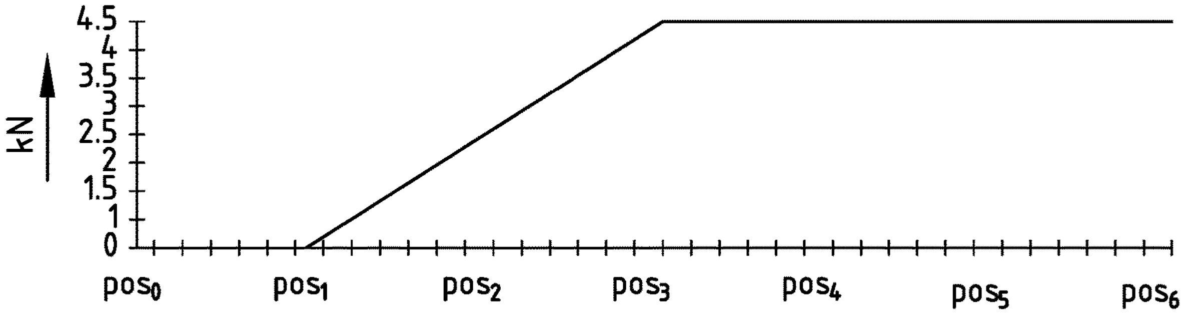
FIG. 9 shows a graph of the clamping force by the braking member and the opposite wheel or gear on the rail of the overspeed governor of FIG. 1.

FIG. 9 shows a graph of the clamping force by the braking member 205 and the opposite wheel or gear on the rail 6. The clamping force ensures that the braking member 205 has sufficient grip on the rail 6.

The invention has thus been described by means of a preferred embodiment. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein. An element is to be considered equivalent to an element specified in the claims at least if said element performs substantially the same function in substantially the same way to yield substantially the same result as the element specified in the claims.

The invention claimed is:

1. An overspeed governor for a stairlift, the overspeed governor comprising:

a governor frame which is mountable to a carriage of the stairlift;

a wheel which is rotatably mounted in said frame around a rotation axis and arranged to engage a rail of said stairlift, along which said carriage is moveable, such that, while being engaged to the rail, translation of the carriage along said rail is transformed into rotation of said wheel or vice versa; and a safety braking device which is mounted in said frame, having a braking member comprising a braking surface being movable between a first position and a second position;

wherein, in the first position, the braking surface does not engage the rail;

wherein said braking member is coupled to said wheel such that, when said wheel rotates at an operational speed at or above a predetermined speed threshold, the braking member is moved from the first position to the second position;

wherein, in the second position, the braking surface engages said rail with a braking force which is high enough to stop movement of the carriage along the rail; and wherein the safety braking device is provided with a soft-landing means designed to gradually slow down the movement of the carriage along the rail after the braking member is moved away from the first position and before the movement of the carriage is stopped;

wherein said braking surface is movable between said first position, a third position between said first and second positions, and said third position;

wherein, when said wheel rotates at said operational speed at or above said predetermined speed threshold, the braking member is moved from the first position to the third position;

wherein, in the third position, the braking surface engages said rail with a minimum braking force which is not high enough to stop movement of the carriage along the rail;

wherein the braking member is designed such that the braking force on the rail gradually increases when it moves from the third position to the second position;

wherein said braking member is further designed such that, once the braking surface engages the rail in the third position, the braking surface is moved to the second position by the weight of the carriage and where applicable the weight of a person sitting on the carriage, thereby forcing said stop; and wherein said soft-landing means is designed to exert a force against the braking member while moving between the third position and the second position, such that the movement of the braking member from the third position to the second position is hindered and slowed down by said soft landing means, such that said gradual increase of the braking force on the rail is slowed down when it moves from the third position to the second position;

wherein said soft landing means comprises a first friction member connected to said braking member and having a first friction surface, and a second friction member connected to said frame and comprising a second friction surface, and wherein said exerting said force against the braking member comprises said first friction surface of said first friction member exerting a frictional force against said second friction surface of said second friction member; and wherein said first friction member is a cam, and said second friction member is a cam disc having a friction surface which at least partially extends in non-concentric curves around said rotation axis, such that said force against said braking member varies in accordance with the curved shape of said friction surface.

2. The overspeed governor in accordance with claim 1, wherein the soft landing means comprises a spring member, one end of which is connected to said braking member and the other end of which is connected to said frame, wherein exerting said force against the braking member comprises said spring exerting a spring force on said braking member.

3. The overspeed governor in accordance with claim 1, wherein the soft-landing means is designed to exert a gradually increasing force against the braking member while moving between the third position and the second position.

4. The overspeed governor in accordance with claim 1, wherein the soft-landing means is designed such that the force against the braking member significantly drops down before the second position is reached, and such that the further rotation of the braking member to the second position is ensured, until further movement of the braking member is stopped in said second position.

5. The overspeed governor in accordance with claim 1, wherein said cam disc and said braking member are mounted in a mutually coaxial relationship.

6. The overspeed governor in accordance with claim 1, wherein said braking member comprises two spaced apart ones of said braking surfaces, arranged such that both of said braking surfaces do not engage the rail when the braking member is in said first rotational position;

wherein one of said braking surfaces is forced to engage said rail when the braking member is in an upwards second rotational position and the other one of said braking surfaces is forced to engage said rail when the braking member is in a downwards second rotational position, wherein said upwards and downwards second rotational positions are mirrored with regard to the first rotational position; and wherein said soft landing means is also mirrored with regard to the first rotational position.

7. The overspeed governor in accordance with claim 1, wherein said braking surface extends in non-concentric curves around said rotation axis.

8. The overspeed governor in accordance with claim 1, wherein said braking surface is formed by teeth.

9. The overspeed governor in accordance with claim 1, wherein said wheel is a toothed gear wheel or a smooth wheel having a flat rail engagement surface.

10. The overspeed governor in accordance with claim 1, wherein said governor frame comprises a shaft which has said rotation axis as its central axis, on which said wheel and braking member are rotatably mounted, said shaft being mountable to the carriage of the stairlift.

11. A stairlift carriage provided with the overspeed governor in accordance with claim 1.

12. The stairlift carriage in accordance with claim 11, wherein said stairlift carriage comprises a second wheel or gear arranged to engage said rail such that said second wheel or gear and said braking member engage the rail at opposite sides, and such that the second wheel or gear and the braking member clamp the rail between them when the braking member is in the second position.

13. The stairlift carriage in accordance with claim 12, wherein said second wheel or gear is a motor driven wheel or gear.

* * * * *